United States Patent
Dorfman et al.

(10) Patent No.: US 9,912,697 B2
(45) Date of Patent: Mar. 6, 2018

(54) VIRTUAL PRIVATE NETWORK BASED PARENTAL CONTROL SERVICE

(71) Applicant: AOL INC., Dulles, VA (US)

(72) Inventors: Scott Dorfman, Reston, VA (US); Anthony M. Spinelli, Leesburg, VA (US); Umesh S. Chhatre, Ashburn, VA (US)

(73) Assignee: Oath Inc., Dulles, VA (US)

( * ) Notice: Subject to any disclaimer, the term of this patent is extended or adjusted under 35 U.S.C. 154(b) by 52 days.

(21) Appl. No.: 14/728,713

(22) Filed: Jun. 2, 2015

(65) Prior Publication Data
US 2016/0359909 A1 Dec. 8, 2016

(51) Int. Cl.
*H04L 29/06* (2006.01)
(52) U.S. Cl.
CPC .......... *H04L 63/20* (2013.01); *H04L 63/0272* (2013.01); *H04L 63/102* (2013.01)
(58) Field of Classification Search
CPC ....... H04L 63/102; H04L 63/10; H04L 63/20; H04L 63/0272; H04L 63/0227
See application file for complete search history.

(56) References Cited

U.S. PATENT DOCUMENTS

| | | | | | |
|---|---|---|---|---|---|
| 7,836,192 | B2* | 11/2010 | Johnson | .................. | A63F 13/10 463/29 |
| 8,443,382 | B2* | 5/2013 | Taylor | .................... | G06Q 10/06 725/29 |
| 8,490,176 | B2* | 7/2013 | Book | .................... | G06F 21/305 713/165 |
| 9,560,053 | B2* | 1/2017 | Prisser | .................. | H04L 63/102 |

* cited by examiner

*Primary Examiner* — Zachary A Davis
(74) *Attorney, Agent, or Firm* — Shook, Hardy & Bacon, L.L.P.

(57) ABSTRACT

In various embodiments, methods and systems for implementing parental controls on mobile devices using virtual private network (VPN)-based parental control services are provided. A parental control profile is received at a controlled device where the parental control profile includes instructions to configure the controlled device with a device control policy. A VPN is configured using the parental control profile. The VPN can be a virtual point-to-point connection between the controlled device and a network of the parental control service platform. Requests for resources from the controlled device are communicated using the VPN such that access to a resource of the resource request is based on a parental control server referencing a device control policy in the VPN-based parental control service. The device control policy includes at least a selected predefined parental control policy. It is contemplated that custom restricted resources and additional controls can be configured for the device control policy.

20 Claims, 14 Drawing Sheets

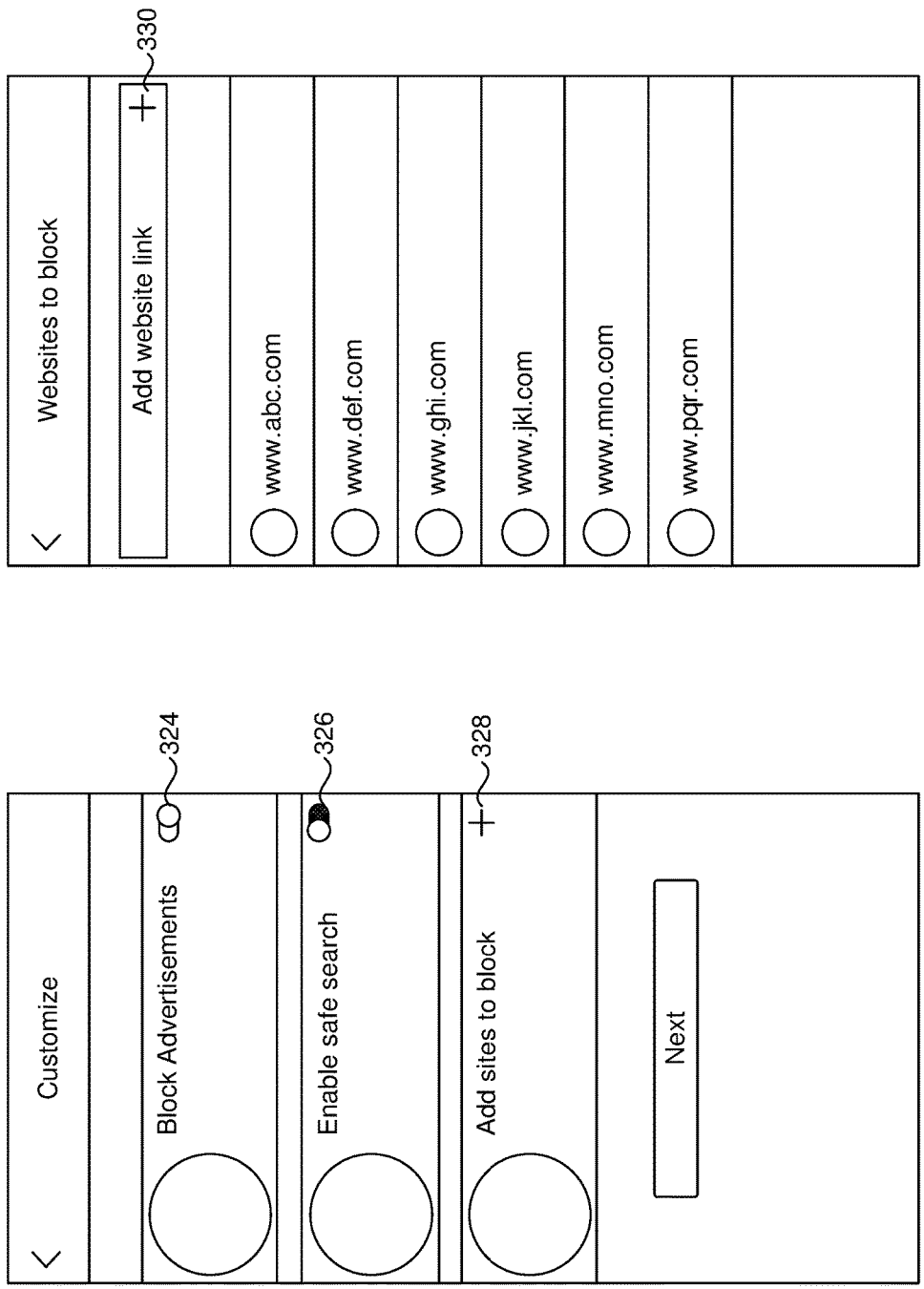

FIG. 3H

Step 3: Device time restrictions + ~332
~334A
Time of day
All day
Starts         03:15 AM
Ends           05:15 PM
Repeat         Never >

Done

FIG. 3I

Step 3: Device time restrictions + ~332
~334B
Time of day
All day
Starts         03:15 AM
Ends           05:15 PM
Repeat         Never >

Done

FIG. 3J

Step 3: Device time restrictions  +  ~332

Time of day

All day

Starts    03:15 AM

Ends    05:15 PM

Repeat    Never ⌄

Never

Everyday

Monday - Friday

Weekends

Done

Done!

Type in the following URL on the browser of your child's phone to setup the restriction.

www.abcdefg.com/kjhkhk  ~338

Send link as text email link

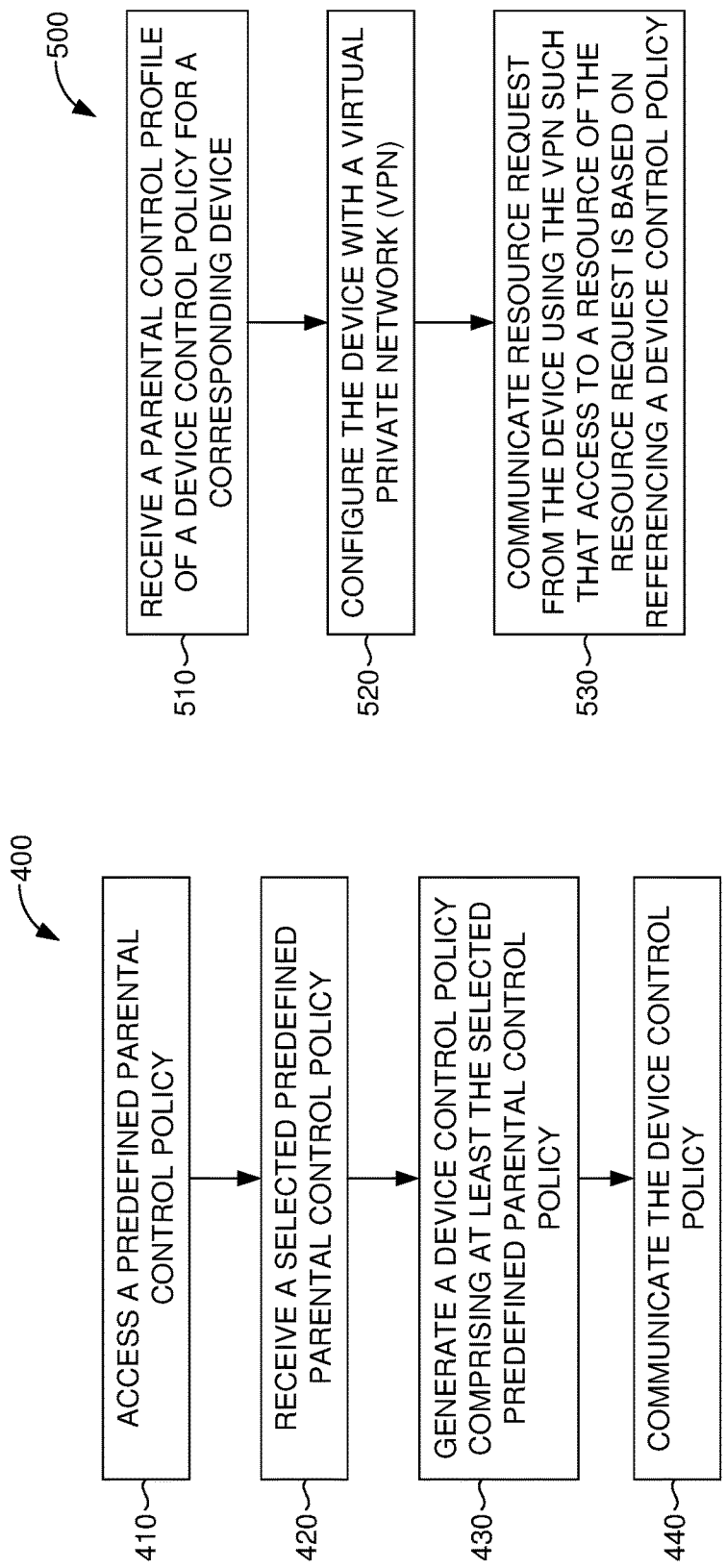

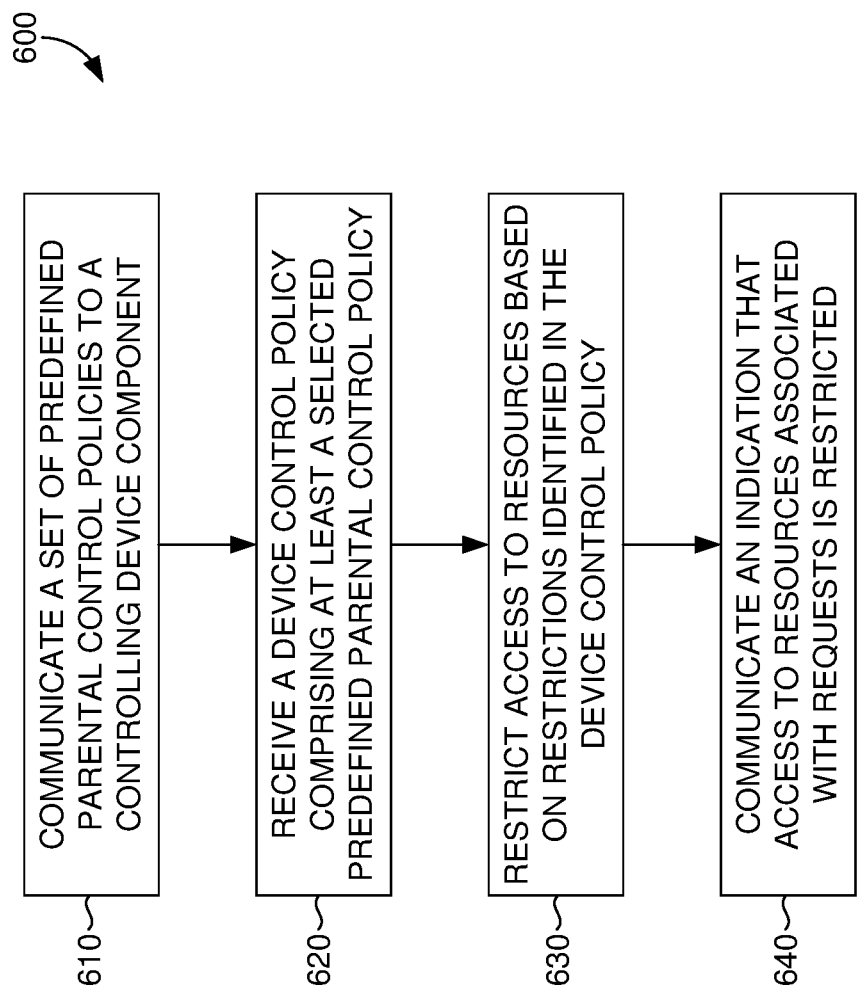

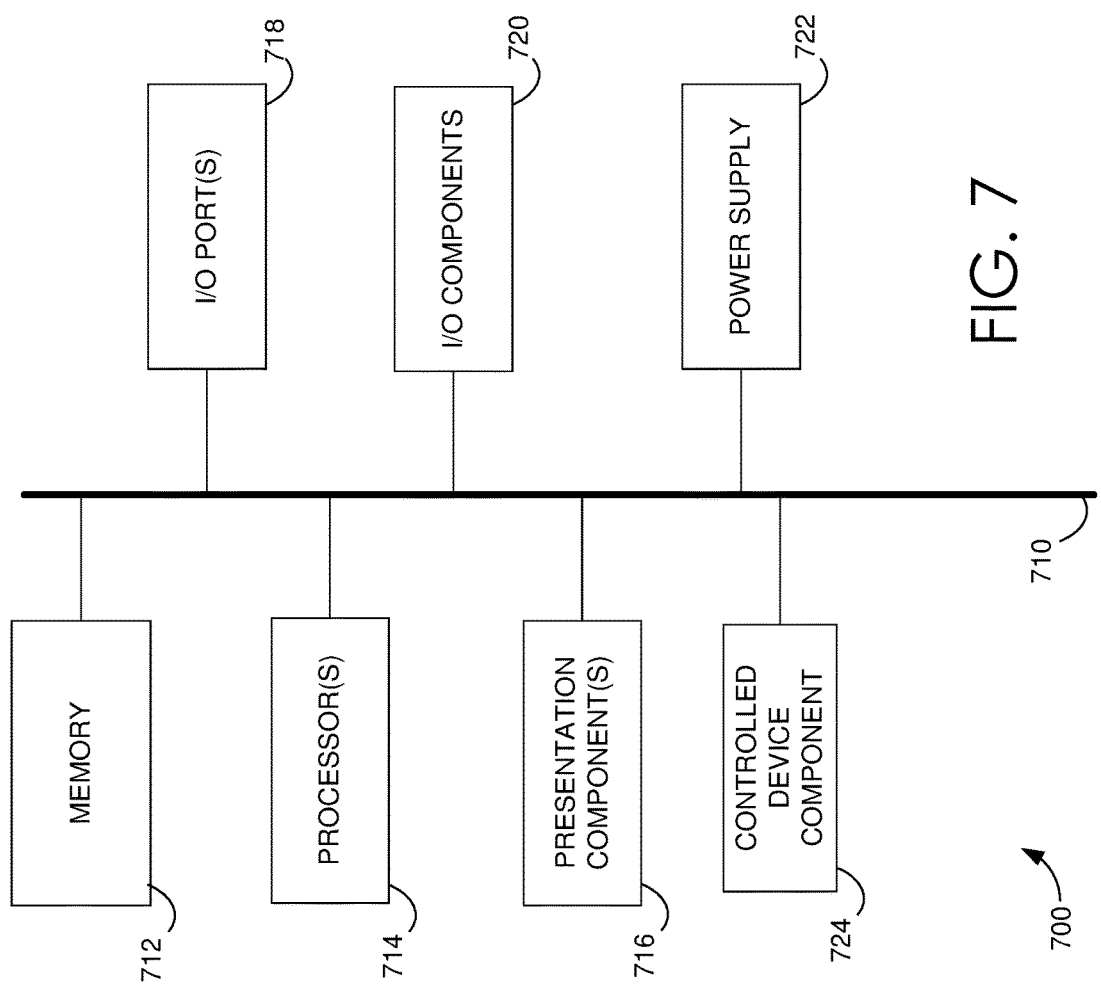

VIRTUAL PRIVATE NETWORK BASED PARENTAL CONTROL SERVICE

BACKGROUND

Parental controls generally refer to features that regulate access to content. Parental controls can be included in a variety of media platforms, from video games and television services to mobile devices and software. Parental controls can be defined for content that is configured, stored, and accessed differently. Implementing and managing parental controls for media platforms and content can present challenges with increased accessibility to media platforms and different types of content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide methods and systems for implementing parental controls on mobile devices using virtual private network (VPN)-based parental control services. A set of predefined parental control policies is accessed at a controlling device that implements a parental control service interface for configuring parental control services for a controlled device. A predefined parental control policy comprises a plurality of restricted resources. The set of predefined parental control policies can be provided via the parental control service interface to a user using a VPN-based parental control service. A selected predefined parental control policy is received from the user. The selected predefined parental policy is associated with a parental control profile of the user. The parental control profile comprises instructions to configure a controlled device to be restricted based on a device control policy. The device control policy is generated at the controlling device. The device control policy comprises at least the predefined parental control policy. It is contemplated that custom restricted resources and additional controls (e.g., usage controls and application controls) can be configured for the device control policy. The device control policy is communicated to a parental control server. The parental control server can restrict access to resources based on restricted resources identified in the device control policy, where requests for resources are received at the parental control server using a VPN of the parental control service. It is contemplated that configuring the controlled device comprises the parental control server communicating the parental control profile to the controlled device such that the VPN is configured using the parental control profile. The VPN restricts and directs communications from the controlled device to the VPN for enforcement of the device control policy.

BRIEF DESCRIPTION OF THE DRAWINGS

The present invention is described in detail below with reference to the attached drawing figures, wherein:

FIGS. 3A-3M are schematics of an exemplary application configuration manager interface of a parental control service system, in accordance with embodiments described herein;

FIG. 4 is a flow diagram showing an exemplary method for implementing parental controls on devices using virtual private network (VPN)-based parental control services, in accordance with embodiments described herein;

FIG. 5 is a flow diagram showing an exemplary method for implementing parental controls on devices using virtual private network (VPN)-based parental control services, in accordance with embodiments described herein;

FIG. 6 is a flow diagram showing an exemplary method for implementing parental controls on mobile using virtual private network (VPN)-based parental control services, in accordance with embodiments described herein; and FIG. 7 is a block diagram of an exemplary computing environment suitable for use in implementing embodiments described herein.

DETAILED DESCRIPTION

Figure 1:
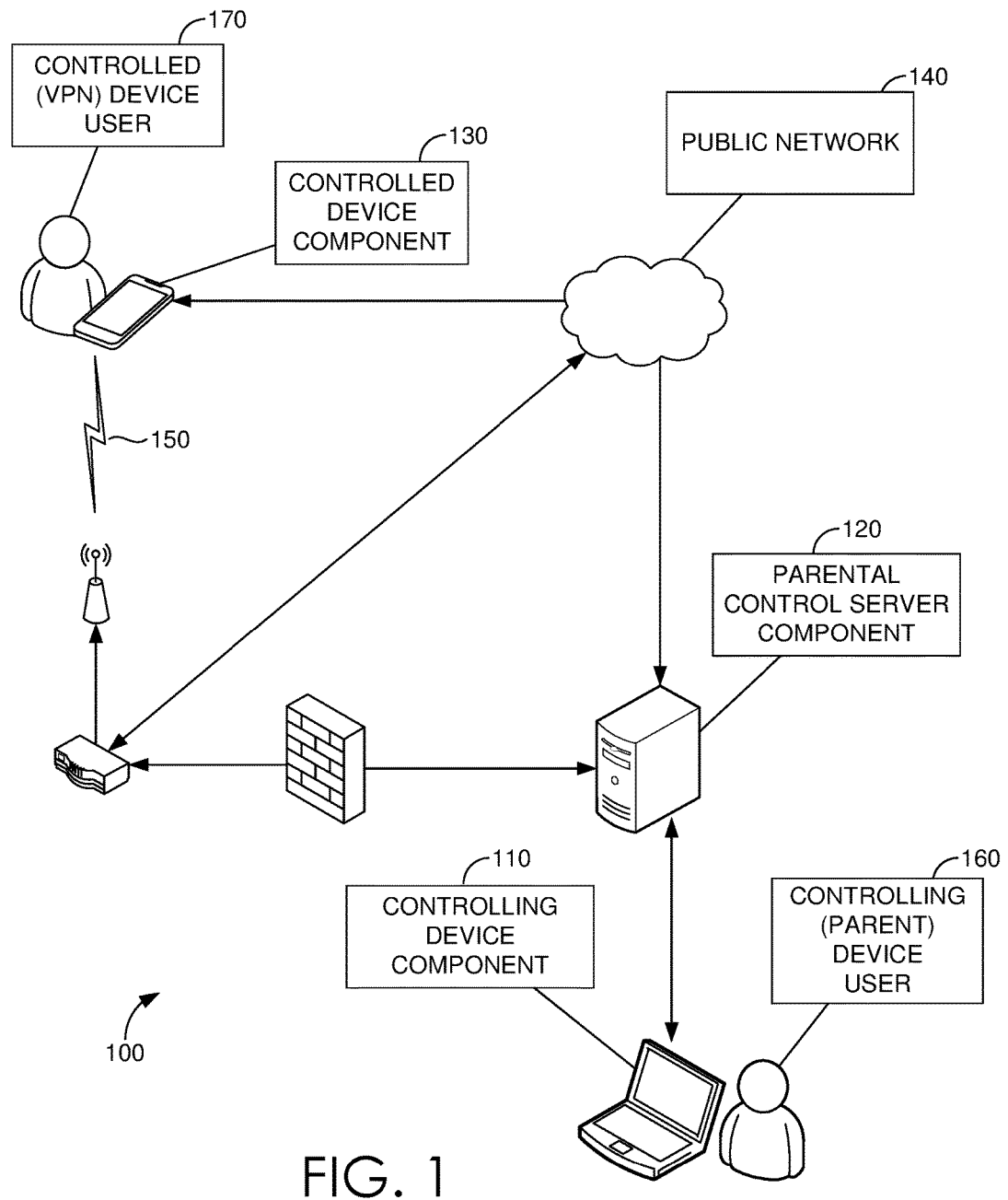
FIG. 1 is a block diagram of an exemplary parental control service system in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Parental controls include features (e.g., content controls, application controls, and usage controls) that regulate or restrict access to content of different devices (e.g., mobile devices). Implementing and managing parental controls for mobile devices can present challenges with increased accessibility to mobile devices and content that is stored and accessed differently. In particular, mobile device parental controls can be difficult because mobile devices may not be readily physically available for configuring parental controls. And, more importantly, an understanding of operational elements and access configuration elements of mobile devices and resource providers and resources may be required to implement parental controls. For example, operational elements and access configuration elements can include knowledge of how a content provider server stores resources, how a mobile device accesses the resources, and technical details of resource locations and types of resources. As such, with conventional parental control services that support parental controls on mobile devices, users (e.g., parents) are expected to have a technical knowledge to implement protection against unwanted content. In addition, parents are expected to actively update restricted content on their own without much assistance. Some systems implement global blocks that can block content that would otherwise be acceptable. As such, a comprehensive parental control service that supports implementing parental controls on mobile devices to alleviate the above-described expectations on users can optimize implementing parental controls on mobile devices.

Embodiments of the present invention provide simple and efficient methods, systems, and interfaces for implementing parental controls on devices, based on a virtual private network (VPN)-based parental control service. The device can specifically be a mobile device with outbound connectivity for both Wi-Fi and cellular data traffic that can be restricted as described herein. The VPN-based parental control service leverages a VPN in order to provide parental controls to the mobile device whose requests for resources are communicated through the VPN. It is contemplated that the VPN can be implemented as a third-party service upon which a parental control service web proxy server is implemented to restrict access to restricted resources. The VPN can facilitate implementing parental controls based on predefined parental control policies selected for corresponding mobile devices (e.g., VPN device) and implemented via the VPN. The VPN extends a private network across a public network. As such, the VPN device operates as if the VPN device is connected to the private network. Parental controls can be implemented on the VPN device via the VPN. The parental control policies can be predefined in that they are associated with tiers. Tiers indicate an extent of restricted resources of a predefined parental control policy such that a user (e.g., parent) can simply select a tier for the VPN device without having to fully control the details of individual tiers. Tiers can be level-based tiers (e.g., high, medium, low) or age-range-based tiers (e.g., 6-9, 10-12, and 13-14). It is contemplated that custom restricted resources and additional controls (e.g., usage controls, and application controls) can be implemented along with the predefined parental control policy.

Various terms are used throughout this description. Although more details regarding various terms are provided throughout this description, general definitions of some terms are included below to provide a clearer understanding of the ideas disclosed herein:

A resource can refer to an entity that can be identified, named, addressed, accessed, or handled from a computing device. A resource can be an addressable object, such as, documents, files, or other web resources. A resource can specifically be addressed using a uniform resource locator (URL).

A predefined control policy can refer to rules for restricting a set of resources. The set of restricted resources can be identified based on a human-assisted process that selects resources to be restricted. The predefined control policy can be associated with a tier element. A tier element can indicate an extent of restricted resources of the predefined control policy. Through the human-assisted process, the predefined control policy restricted resources are selected with reference to the particular tier element. A predefined control policy can have a tier element such that a user of the parental control service can select a predefined control policy based on the tier element of the predefined control policy.

A parental control profile can refer to information for defining a parental control service for a user. The parental control profile can include a set of instructions for configuring a device. The parental control profile can be associated with a user that is configuring one or more controlled users and devices in the parental control service. The parental control profile can include information about the user. The parental control profile is communicated to a device such that the instructions of the parental control profile can be used to configure a virtual private network (VPN) on the device. The parental control profile can also indicate a device control policy which can be used to restrict access to resources for a device.

A device control policy can refer to a set of parental controls that can be associated with a device. A device control policy can include a set of restricted resources from a predefined parental control policy. The restricted resources can be identified based on a predefined control policy selected when generating the device control policy. The device control policy can further include custom restricted resources and additional controls.

A parental control service platform refers to integrated components of hardware architecture and/or software framework that support the VPN-based parental control service. The parental control service platform can specifically support a parental control service interface (e.g., a web portal interface or an application configuration manager interface) for configuring parental control profiles and generating device control policies for corresponding devices as described herein.

Referring now to FIG. 1, FIG. 1 illustrates an exemplary parental control service platform system ("parental control system") 100 in which implementations of the present disclosure may be employed. In particular, FIG. 1 shows a high level architecture of parental control system 100 having a platform and communicating using components in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, parental control system 100 includes a controlling device component 110, a parental control server component 120, a controlled device component 130, a public network 140, and a virtual private network (VPN) 150. Also shown are a controlling device user 160 and a controlled device user 170. The components of the parental control system 100 may communicate with each other over one or more networks (e.g., the public network 140 or the VPN 150). The public network 140 may include, without limitation, one or more local area networks (LANs) and/or wide area networks (WANs). Any number of nodes (e.g., servers) and client computing devices may be employed within the parental control system 100 within the scope of implementations of the present disclosure. The VPN 150 extends a private network across the public network 140. The private network can be the parental control service network and a public network can be the internet. The VPN 150 can facilitate a VPN device to send and receive data across public networks. The VPN can specifically support connectivity for both Wi-Fi and cellular data traffic. The VPN device operates as if it was directly connected to the private network, while utilizing components of the private network.

In the parental control system 100, the components are provided by a parental control service platform. The parental control service platform comprises several components operating together to provide the parental control service feature as described herein. By way of example, three main components can be involved, the controlling device component 110, the parental control server component 120, and the controlled device 130. A parent can register and configure a parental control profile using a parental control service interface of the controlling device component 110. The parental control service interface can be a web-based portal interface or an application configuration manager interface. The parental control profile can be password protected. The parental control profile can be associated with one or more children with one or more corresponding controlled devices such that the devices are controlled using the parental control services.

The controlling device component 110 can further implement the parental control service interface that supports receiving and communicating a predefined parental control policy, custom resource restrictions, and additional controls for a device control policy. The predefined parental control policy can be associated with a tier element that indicates an extent of restricted resources in the predefined parental control policy. The predefined parental control policy can be defined and automatically updated with new restricted resources based on a human-assisted process. Updating the predefined parental control policy can include investigating and reviewing new resources available on the internet. It is contemplated that configuring controls can be a one-button solution via the parental control service interface. The controlling device component 110 can communicate the parental control profile and the device control policy to the parental control server component 120 to restrict the devices.

The parental control component 120 can receive, store, and communicate the parental control profile. The parental control profile can be, in particular, used to configure the controlled device 130. The controlled device 130 can receive the parental control profile to configure a VPN on the controlled device 130. The VPN effectively takes over the device and restricts resource requests to the VPN and communicates the resource requests through the VPN. A resource request stream from the controlled device 130 can be inspected at the parental control server component 120 to restrict access to resources that are identified in the device control policy.

Having described various aspects of the parental control system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Figure 2A:
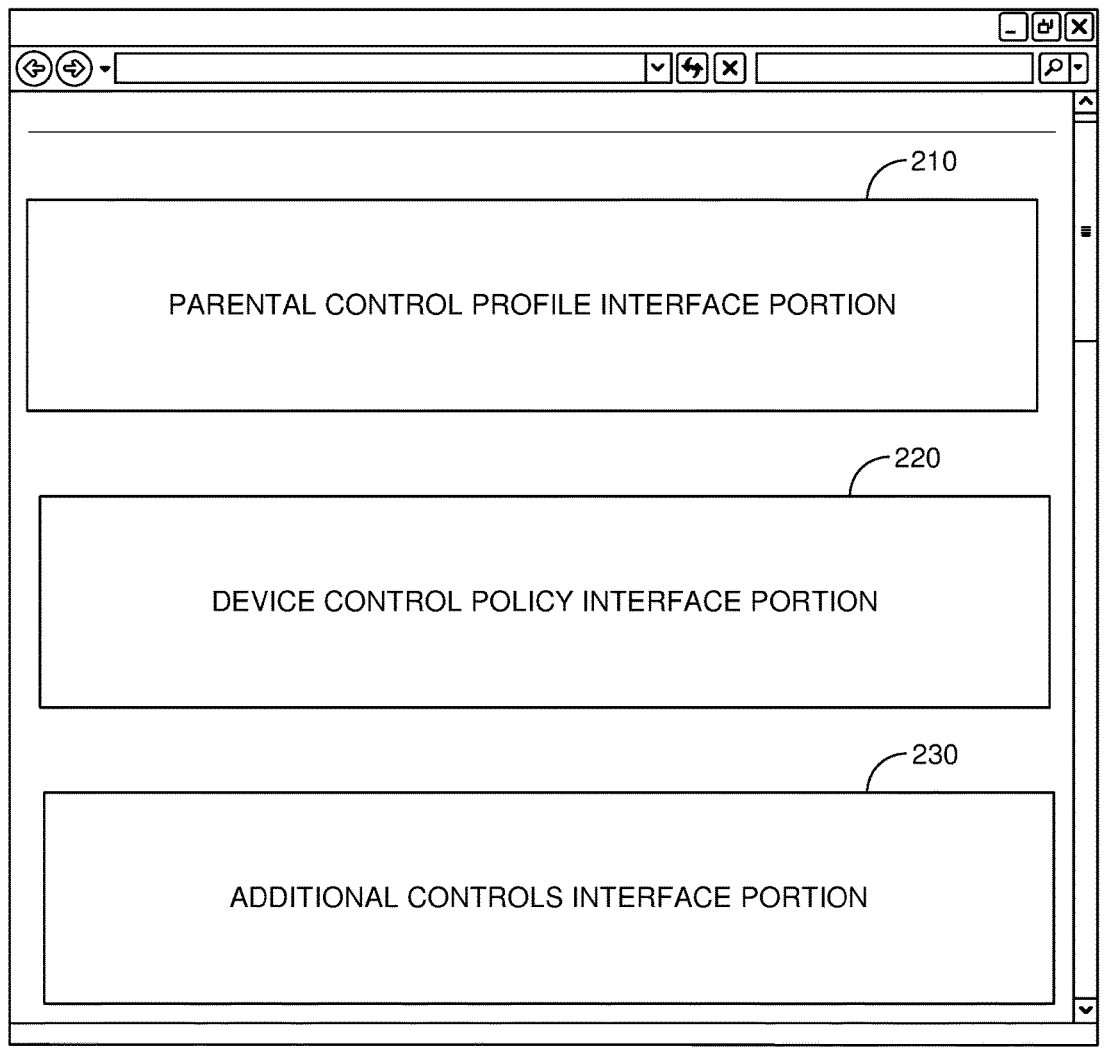
FIGS. 2A-2C are schematics of exemplary parental control interfaces of a parental control service system, in accordance with embodiments described herein.

With reference to FIG. 1 and FIG. 2A, the controlling device component 110 can be responsible for managing a parental control interface 200A and user configurable operational elements. The controlling device component 110 can generate the parental control service interface 200A to receive configurations for operational elements. The parental profile interface can include a parental control profile interface portion 210, the device control policy interface portion 220, and an additional controls interface portion 230. The parental profile interface portion 210 can include interface elements that are generated to receive parental control profile information input. For example, the controlling device component 110 can implement an authentication mechanism. Various types of authentication mechanisms are contemplated. The authentication mechanism can be used to authenticate the user on the controlling device 110 and the controlled device 130. The authentication mechanism can be a key, generated to the bind user and the parental control profile to the controlled device. A user can also define a user name and password for the parental control profile. In addition, a user can provide personal user information for the parental control profile. Other variations and combinations of parental profile configurable operational elements are contemplated with embodiments described herein.

The parental control service interface 200A can also include the device control policy interface portion 220 for receiving input for the device control policy. A user can identify a controlled user and a device and select a predefined parental control policy for the controlled user and device. The predefined parental control policy can be associated with a tier element. The tier element indicates an extent of restricted resources of the predefined parental control policy and can include specific descriptions of the types of resources that are restricted in the predefined parental control policy. For example, a first tier can block certain web content and inappropriate advertisements and a second tier can block certain web content, inappropriate advertisements and social networks. In this regard, the first tier restricts resources at a lower extent than the second tier. The device control policy interface portion 220 can also include interface elements that allow for receiving inputs for custom restricted resources. For example, a user can specifically configure a uniform resource locator (URL) that is not specified in the predefined parental control policy as a custom restricted resource such that the URL is restricted if requested from a controlled device 130.

The parental control service interface 200A can further include the additional controls interface portion 230. The additional controls interface portion 230 facilitates defining operational elements for additional controls including usage controls and application controls. Additional controls can be associated with a device control policy for a controlled device and a controlled device user. A usage control can include time-based controls that restrict access outside of a predefined connectivity window. Basically, a controlled device is allowed access to a requested resource during a permitted connectivity time window and restricted from accessing resources outside of the connectivity time window. Application controls can turn off access to certain applications (e.g., FACEBOOK, SKYPE, or CAMERA). In this regard, the additional controls interface portion 230 provides interface elements for defining the connectivity time window for usage controls and identifying blocked applications for the application controls.

Figure 2B:
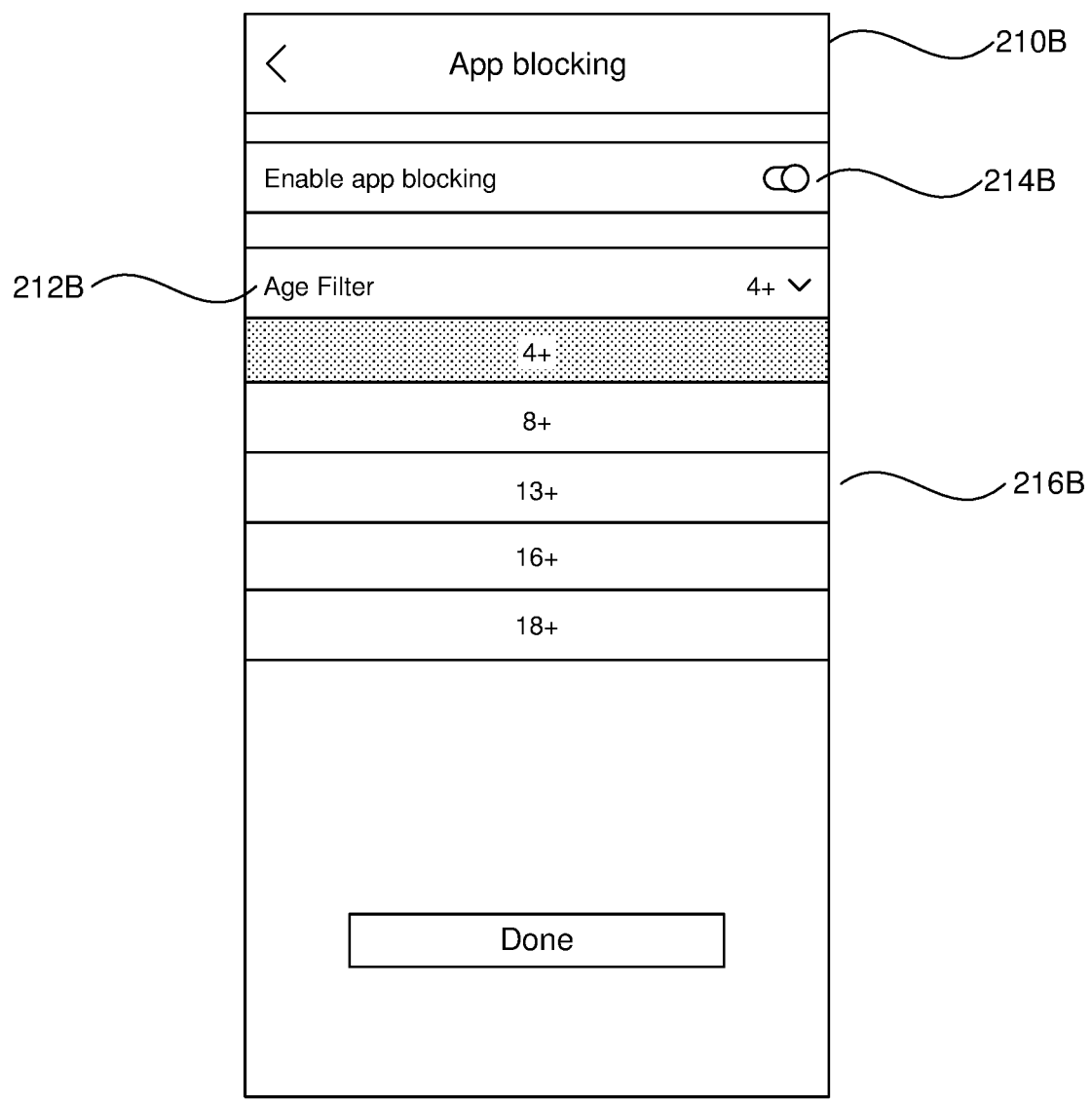

With reference to FIG. 2B, exemplary interfaces for configuring additional controls using a parental control interface are illustrated. In one embodiment, an application configuration manager interface comprises application blocking screen 210B having an age filter configuration element 212B implemented for blocking applications or specific segments of an application. The age filter can refer to an age rating associated with an application, such that applications or segments thereof are blocked based on the age rating of the application. A user can select to enable application blocking based on a toggle button 214B. The user can select one of several selectable age filters 216B to associate with the application blocking feature. As such, selecting a 4+ age filter blocks applications having an age rating of 4 and over.

Figure 2C:
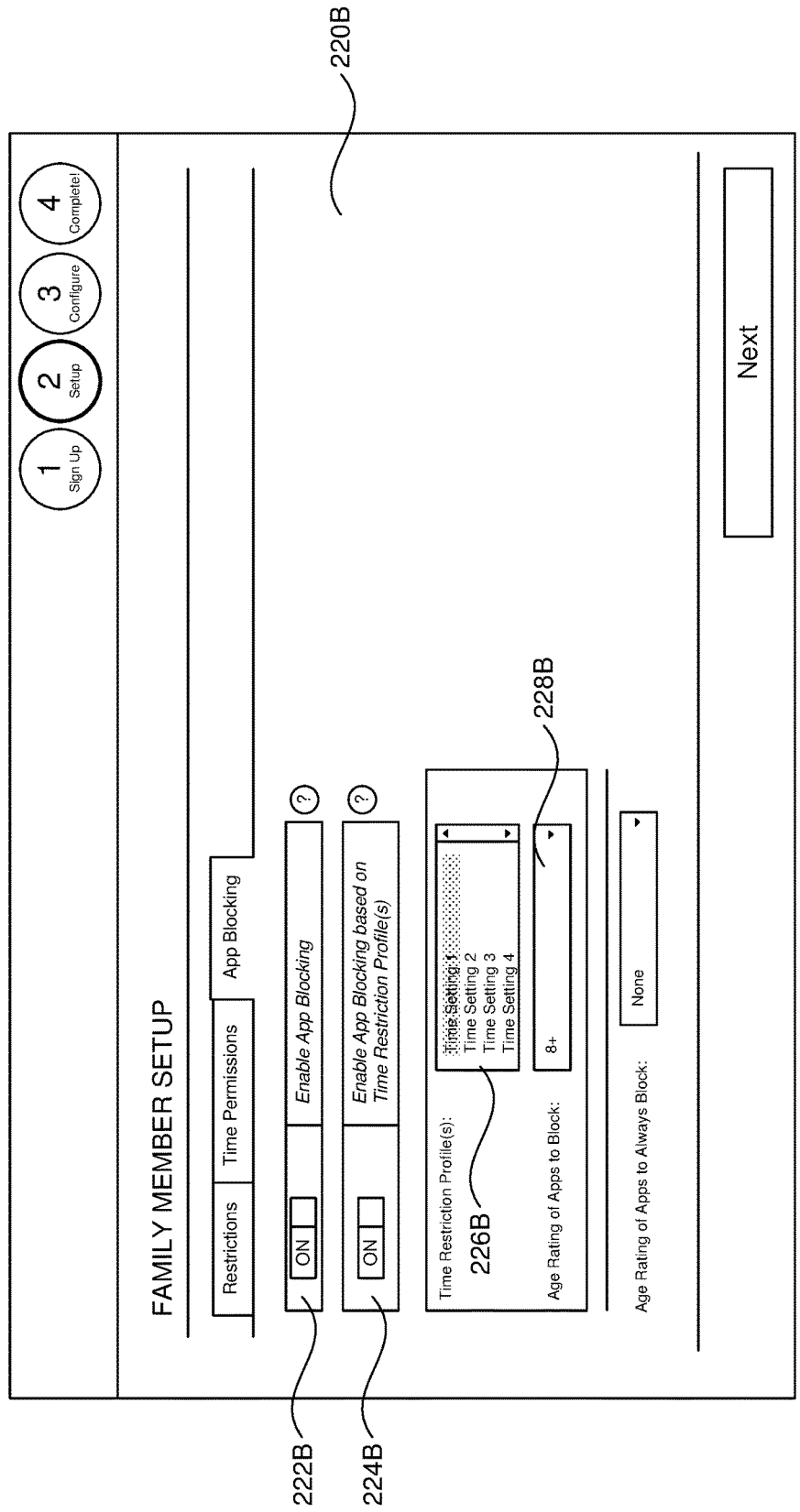

With reference to FIG. 2C, a parental service interface (e.g., web-based portal) can also include a configuration screen 220B for configuring application blocking. As shown, it is contemplated that application blocking or hiding can be enabled as a global setting associated with a specific controlled user. In this regard, application blocking can be associated with controlled VPN devices of the controlled user. The global setting can be enforced continuously to hide applications of a particular rating. For example, an application having a 17+ rating can be blocked for a particular controlled user. A toggle button 222B can be selected to turn on application blocking.

A time-based application blocking or hiding can further be configured to be enforced during specific time windows. A toggle button 224B can be selected to turn on application blocking based on a time restriction profile. A time restriction profile comprising one or more time settings can also be selected for a controlled user from a plurality of time settings 226B. A time setting can include one or more time ranges (e.g., time range—9 P.M. to 5 A.M.) that when selected, applications, or segments thereof, are hidden, disabled, or otherwise restricted from a controlled user. For example, an application having a 4+ rating can be hidden from 9 P.M. to until 5 A.M. overnight. Advantageously hiding applications with a 4+ rating can address applications that do not require a network connection to operate.

It is contemplated that the time restriction profile time settings can be predefined such that a controlling user simply selects one of the available time settings. The time settings for application blocking can be, in addition or in the alternative, defined by the controlling user. The controlling user can, through the parental profile service interface, further select an age rating of applications to block. The age rating of applications to block, can be selected based on a drop down selectable input 228B. The controlling user can also select to always block applications of a particular age rating. Other variations and combinations of filter options and time restriction profiles are contemplated with embodiments of the present invention.

The controlling device component 110 can generate the device control policy. The device control policy includes the selected parental control policy and any custom restricted resources and additional controls. The controlling device component 110 can communicate the device control policy to the parental control server to carry out enforcement of the restrictions. The controlling device component 110 can also generate the parental control profile and communicate the parental control profile to the parental control service. The parental control profile can be used to configure a controlled device with a VPN of the parental control service.

The parental control server component 120 is responsible for managing parental control profiles and device control policies for implementing restricted communication of requested resources. The parental control server component 120 can include a predefined parental control policy store (not shown). The predefined parental control policy store can include a set of predefined parental control profiles. The predefined parental control policy can be communicated to the controlling device component 110 such that the parental control service interface presents the predefined parental control policy for selection.

The parental control server component 120 can receive a device control policy having at least a predefined parental control policy. The device control policy can be associated with a parental control profile, a controlled user, and a controlled device. It is contemplated that restricted resources can be enforced using a restricted location table that can be referenced upon receiving a resource request. Restricted resources can be grouped together in a predefined parental control policy in an easy to understand tier element to quickly communicate to different types of users of the parental control service restrictions implemented on a controlled device. A tier element can indicate an extent of restricted resources for a predefined parental control policy. For example, a tier element can be levels (e.g., high, med, low) or age ranges (e.g., 6-9, 10-12, and 13-14).

The parental control server component 120 can also perform mobile device management for administering the different controlled devices for functionality described herein. Mobile device management can include controlling and protecting data and configuration settings of the mobile devices with reference to restricting resources using the VPN-based parental control service. By way of example, the parental control server component 120 can maintain a user table (e.g., a subscriber master table). The user table can include a mapping to the VPN credentials of corresponding controlled devices to keep track of VPN credentials for the controlled devices.

The parental control server component 120 can implement restrictions based on the device control policy. As such, the parental control server component can implement a predefined parental control policy, a usage control, and an application control. The parental control server component can include a firewall that controls both incoming and outgoing network traffic from the controlled device 120 based on the device control policy. The firewall establishes a barrier between a trusted, secure internal private network of the parental control service and the public network. It is further contemplated that the parental control server component can include proxy services to provide administrative control over the content that can be relayed to and from the controlled device 130.

In operation, by way of example, the parental control server component 120 can implement the device control policy based on account control lists. Account control lists include a list of restrictions or permission tables for a corresponding device of the device control policy. The account control list can also be used to implement usage controls and application controls. The parental control server component 120 can generate block messages upon a resource request being blocked. The parental control server 120 can implement custom block messages for specific usage controls and application controls.

The parental control server component 120 can also include a parental control profile store to store, retrieve, and communicate parental controls profile to corresponding devices. The parental control server component 120 can communicate the parental control profiles to corresponding devices. A parental control profile can be initially communicated using a public network. The controlled device 130 can receive a URL that is communicated from the parental control server component 120, for example, using email or text message, such that selecting the email or text can trigger downloading the parental control profile and configuring the VPN.

The parental control profile can include instructions for configuring a VPN of the parental control service on the controlled device. Configuring the VPN can include authenticating the user configuring the VPN based on an authentication mechanism of the parental control profile. For example, the controlled device component can generate an authentication prompt (e.g., request a key or PIN entered) to complete configuration of the VPN on the controlled device. The authentication mechanism also limits the capacity to turn off the VPN on the controlled device 130 without authentication.

Upon authentication, the controlled device is bound to the user, the parental control profile and corresponding device control policy. The VPN takes over network traffic leaving the controlled device. The VPN on the controlled device restricts resource requests from the device to the VPN and communicates the resource requests using the VPN. It is contemplated that the controlled device component 130 can be implemented as an application running on the mobile device. In this regard, the VPN configuration can be performed via the application. The application can further implement additional functionality beyond the VPN configuration. For example, the application can implement an application control that hides applications on end user devices. The application can include a time-based control feature. For example, at 9 PM a Camera application can be hidden from the controlled device and at 7 AM the Camera application can be restored, repeated daily. Other variations and combinations of additional functionality provided using a local application of the VPN-based parental control service are contemplated with embodiments described herein.

In addition, the VPN can be configured such that the VPN is automatically reestablished before any network traffic is communicated if the VPN was otherwise turned off. The resource requests from the controlled device can be inspected at the parental control server based on the device control policy to determine whether to allow access to the resource or restrict access to the resource. When the resource request is blocked at the parental control service component 120, the controlled device component 130 can receive an indication that the resource is blocked.

FIGS. 3A-3M illustrate an application configuration manager parental control service interface. Each figure can correspond to an individual configuration screen provided via the parental control interface to configure operational elements described herein. FIG. 3A includes input fields for email 302 and password 304 such that a user can sign into 306 the application configuration manager using their email and password credentials. A register button 308 is also included to support registering new users who do not yet have credentials.

Figure 3B:
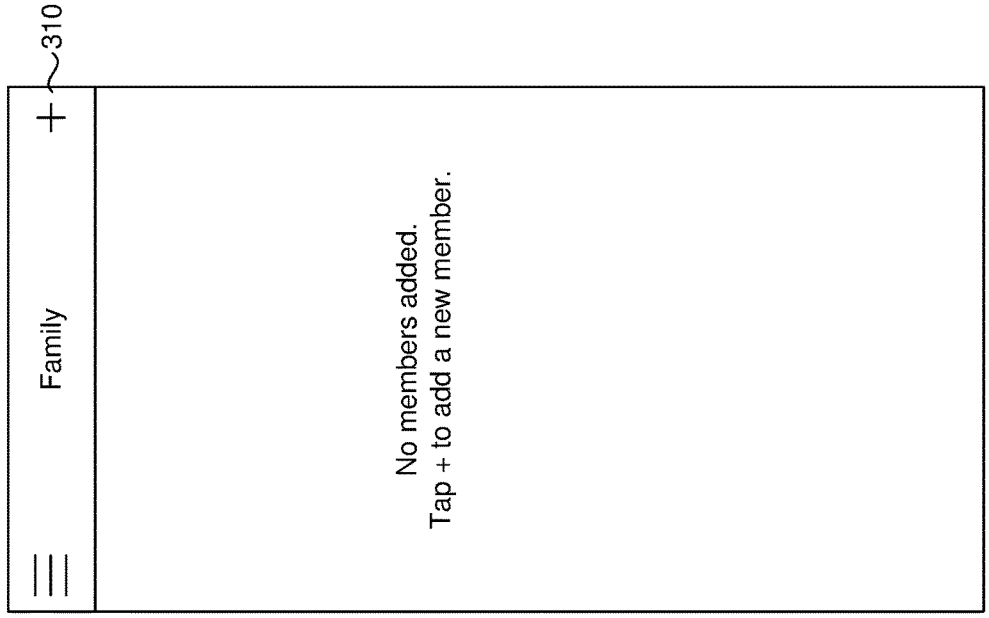
Figure 3A:
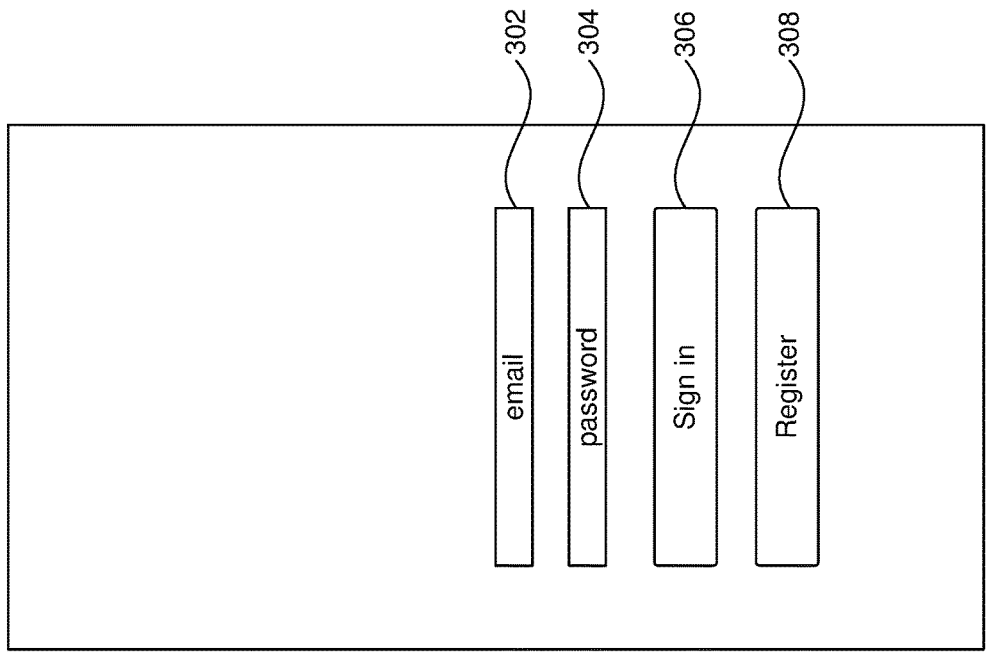
Figure 3D:
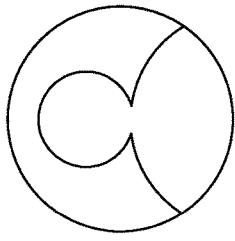
Figure 3C:
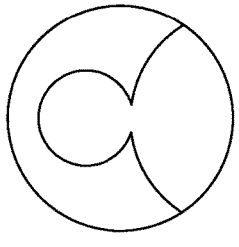

With reference to FIG. 3B, an add new member screen is illustrated. The screen provides interface features (e.g., plus button 310) for adding a new member (e.g., family member) profile to control using the parental control service. FIG. 3C provides a member's name field 312 to enter the member's name and also an add device button 314 to add one or more devices associated with that member. In FIG. 3D, a new member and device—Jennifer 316 and Jennifer's phone 318—have been entered to be controlled using the parental control service.

Figure 3E:
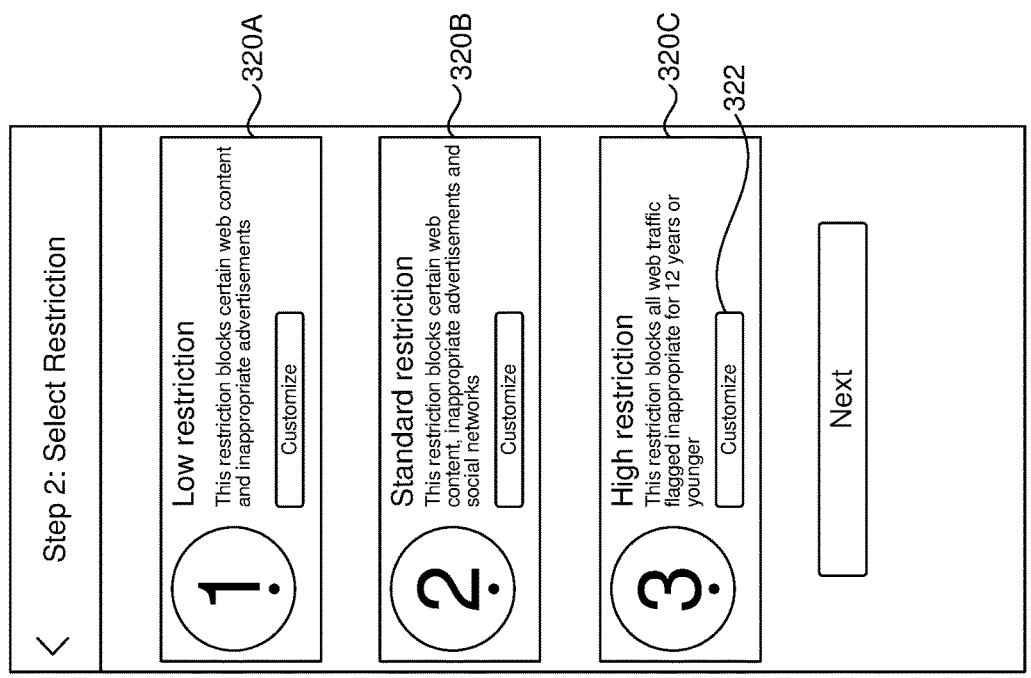

FIG. 3E illustrates three different predefined parental control policies (e.g., 1, 2, 3) 320a, 320b, and 320c. Each policy is associated with a plurality of restricted resources. Each policy can also be associated with a tier element (e.g., low restriction, standard restriction, and high restriction) that indicates an extent of restricted resources of the predefined parental control policy. Each predefined parental control policy can be further customized 322 to advantageously add and potentially remove restricted resources of the predefined parental control policy. For example, with reference to FIG. 3F, configurable elements can include toggle buttons for block advertisements 324 and enable safe search 326, and add sites to block button 328. FIG. 3G illustrates an exemplary plurality of restricted resources (e.g., blocked sites) and an add button 330 for adding a new restricted resource (e.g., URL).

FIGS. 3H and 3I illustrate a usage control 332 for defining a connectivity time window for usage controls including a toggle button to turn the usage control off 334a and on 334b. A usage control restriction can further include start and end time and a toggle to turn the usage control on or off all day. Additional configurable elements can be associated with days of the week and the weekend as shown in FIG. 3J. FIG. 3K can illustrate a configuration completion screen 336 that includes a generated URL 338 that can be accessed using the controlled device for retrieving the parental control profile at the controlled device, and configuring the VPN on the controlled device.

Figures 3L, 3M:
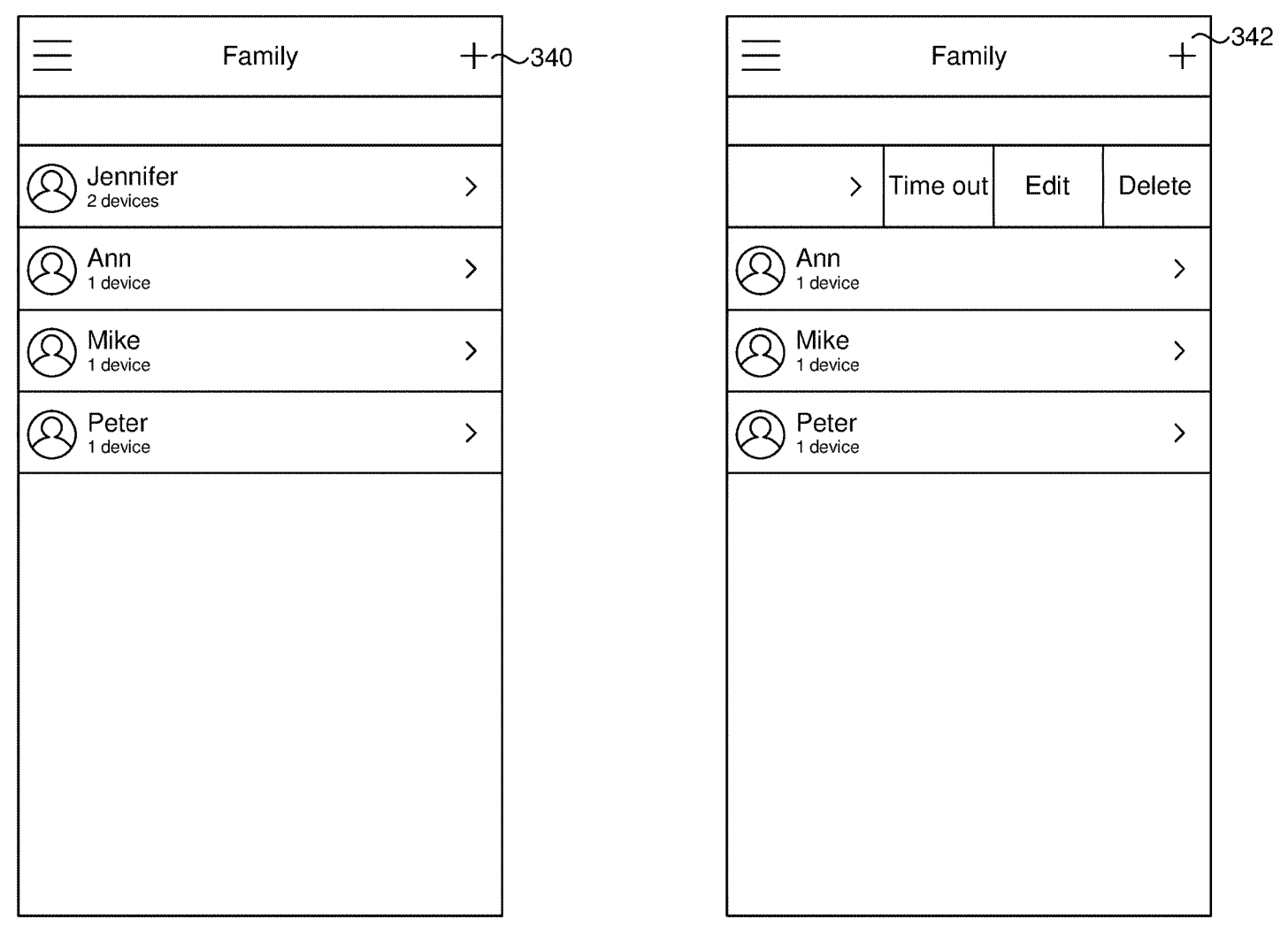

FIG. 3L illustrates an exemplary family home screen 340 that shows several controlled users in the parental control service and number of devices associated with each controlled user. It is further contemplated that individual controlled users and corresponding devices can be removed from the parental control service as shown in FIG. 3M in another exemplary family home screen 342.

Turning now to FIG. 4, a flow diagram is provided that illustrates a method 400 for implementing parental controls on devices using virtual private network (VPN)-based parental control services. Initially at block 410, a set of predefined parental control policies is accessed. A predefined parental control policy comprises a plurality of restricted resources, where the set of predefined parental control policies are provided in a VPN-based parental control platform. At block 420, a selected predefined parental control policy is received. The selected predefined parental control policy is associated with a parental control profile, where the parental control profile includes instructions to configure a controlled device with a device control policy. At block 430, the device control policy for the device is generated. The device control policy comprises at least the selected predefined parental control policy. At block 440, the device control policy is communicated such that enforcement of restrictions is performed on resource requests from the controlled device.

Turning now to FIG. 5, a flow diagram is provided that illustrates a method 500 for implementing parental controls on devices, using virtual private network (VPN)-based parental control services. Initially at block 510 a parental control profile is received. The parental control profile includes instructions to configure a controlled device with a device control policy. At block 520, a VPN using the parental control profile is configured. The VPN comprises a virtual point-to-point connection between the controlled device and a network of the parental control service platform. At block 530, requests for resources are communicated from the device using the VPN such that access to a resource of the resource request is based on referencing a device control policy of a VPN-based parental control service.

Turning now to FIG. 6, a flow diagram is provided that illustrates a method 600 for implementing parental controls on devices, using virtual private network (VPN)-based parental control services. Initially at block 610, a set of predefined parental control policies is communicated to the controlling device component to receive an indication of a selected parental control policy in a device control policy. At block 620, the device control policy for the device is received. At block 630, access to resources is restricted based on restrictions identified in the device control policy. The requests for resources are received via a VPN of the parental control service platform. At block 640, an indication that access to resources associated with requests is restricted, is communicated.

With reference to the parental control system, embodiments described herein can improve parental control services based on a parental control service platform. Parental control service platform components refer to integrated components that can generate parental control profiles and device control policies and can configure a VPN on a controlled device for restricting access to unwanted content and providing other controls. The integrated components refer to the hardware architecture and software framework that support interactive video functionality using the parental control service platform. The hardware architecture refers to physical components and interrelationships thereof and the software framework refers to software providing functionality that can be implemented with hardware operated on a device. The end-to-end software-based parental control service platform can operate within the parental control service platform components to operate computer hardware to provide parental control service platform functionality. As such, the parental control service platform components can manage resources and provide services for the parental control service functionality. Any other variations and combinations thereof are contemplated with embodiments of the present invention.

By way of example, the parental control service platform can include an API library, including specifications for routines, data structures, object classes, and variables, and may support the interaction between the hardware architecture of the device and the software framework of the parental control service platform system. These APIs include configuration specifications for the parental control service platform system such that the controlled device component, the parental server component and the controlled device component can communicate with each other in the parental control service platform, as described herein.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that performs particular tasks or implements particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or controlled device component 724, or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Accordingly, in a first embodiment described herein, a system for implementing parental controls on devices, using virtual private network (VPN)-based parental control services is provided. The system includes a controlling device component configured for: accessing a set of predefined parental control policies, where a predefined parental control policy comprises a plurality of restricted resources. The set of predefined parental control policies are provided in a VPN-based parental control service. The controlling device component is further configured for: receiving a selected predefined parental control policy, where the selected predefined parental control policy is associated with a parental control profile. The parental control profile includes instructions to configure a controlled device with a device control policy. The controlling device component is also configured for generating the device control policy for the device, where the device control policy comprises at least the selected predefined parental control policy, and communicating the device control policy.

The system includes a parental control server component configured for: communicating the set of predefined parental control policies to the controlling device component; receiving the device control policy for the device; restricting access to resources based on restrictions identified in the device control policy, where requests for resources are resources are received via a VPN of the parental control service platform; and communicating an indication that access to resources associated with requests is restricted.

The system also includes a controlled device component configured for: receiving the parental control profile; configuring the device for the VPN using the parental control profile; restricting requests for resources from the device to the VPN; communicating the requests for resources using the VPN; and receiving the indication that access to resources associated with requests is restricted.

In a second embodiment described herein, a computer-implemented method for implementing parental controls on devices using virtual private network (VPN)-based parental control services is provided. The method includes accessing a set of predefined parental control policies, where a predefined parental control policy comprises a plurality of restricted resources. The set of predefined parental control policies are provided in a VPN-based parental control platform. The method further includes receiving a selected predefined parental control policy, where the selected predefined parental control policy is associated with a parental control profile. The parental control profile includes instructions to configure a controlled device with a device control policy. The method also includes generating the device control policy for the device, where the device control policy comprises at least the selected predefined parental control policy. The method includes communicating the device control policy such that enforcement of restrictions is performed on resources requested from the controlled device.

In a third embodiment described herein, one or more computer storage media having computer-executable instructions embodied thereon that, when executed, by one or more processors, cause the one or more processors to perform a method for implementing parental controls on devices, using virtual private network (VPN)-based parental control services. The method includes receiving the parental control profile, where the parental control profile includes instructions to configure a controlled device with a device control policy. The method also includes configuring a VPN using the parental control profile, where the VPN comprises a virtual point-to-point connection between the controlled device and a network of a parental control service platform.

The method also includes communicating requests for resources from the device using the VPN. The method further includes receiving an indication that access to resources associated with the requests for resources is restricted.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of the detailed discussion above, embodiments have been described with reference to distributed computing devices, components, and a parental control service platform that supports implementing parental controls using a VPN-based parental control service. Components can be configured for performing novel aspects of embodiments, wherein the components can be programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method for implementing parental controls using virtual private network (VPN)-based parental control services, the method comprising:

accessing a set of predefined parental control policies, wherein a predefined parental control policy comprises a plurality of restricted resources, wherein the set of predefined parental control policies are provided in a VPN-based parental control service, wherein the VPN-based parental control service restricts resource requests from a controlled device, the VPN-based parental control service comprising a local application on the controlled device to implement parental controls on the controlled device via a VPN;

receiving a selected predefined parental control policy, wherein the selected predefined parental control policy is associated with a parental control profile;

generating a device control policy for the controlled device, wherein the device control policy comprises at least the selected predefined parental control policy; and communicating, to a parental control server, the device control policy such that, based on the device control policy, enforcement of restrictions is performed, via the parental control server, on the controlled device, for resource requests from the controlled device, wherein the parental control profile includes instructions to configure the VPN on the controlled device with the device control policy, and wherein the parental control profile is associated with a user that is configuring one or more controlled users and one or more controlled devices in the VPN-based parental control service to indicate device control polices for the corresponding one or more controlled devices.

2. The method of claim 1, wherein the set of predefined parental control policies are accessed using a parental control service interface that is generated using one of: a web-based portal interface or an application configuration manager interface.

3. The method of claim 1, wherein one or more predefined parental control policies of the set of predefined parental control policies are generated using a human-assisted process that selects resources to be restricted, wherein the resources to be restricted are automatically periodically updated based on identified additional resources.

4. The method of claim 3, wherein one or more predefined parental policies of the set of predefined parental control policies are associated with a tier element, wherein the tier element indicates an extent of restricted resources of a predefined parental control policy, the tier element comprising one of: a level tier element, or an age-based tier element.

5. The method of claim 1, wherein the parental control profile is communicated to the parental control server such that the parental control profile is communicated to the controlled device associated with the device control policy, to configure a VPN on the controlled device.

6. The method of claim 1, wherein the device control policy further comprises one or more of the following: a set of custom restricted resources, a usage control implemented based on a defined time window, and an application control associated with a selected application.

7. The method of claim 1, wherein enforcement of the restrictions comprises restricting access to resources based on restricted resources identified in the device control policy, wherein restricting access to resources includes utilizing an access control list having a restrictions table defined based on the device control policy.

8. One or more computer storage media having computer-executable instructions embodied thereon that, when executed, by one or more processors, cause the one or more processors to perform a method for implementing parental controls, using virtual private network (VPN)-based parental control services, the method comprising:
receiving a parental control profile, wherein the parental control profile includes instructions to configure a controlled device with a device control policy;
configuring a VPN using the parental control profile, wherein the VPN comprises a virtual point-to-point connection between the controlled device and a network of the parental control service, the parental control profile including instructions to configure the VPN on the controlled device indicating the device control policy, and wherein the parental control profile is associated with a user that is configuring one or more controlled users and one or more controlled devices in the VPN-based parental control service to indicate device control polices for the corresponding one or more controlled devices; and
communicating one or more requests for resources from the controlled device using the VPN such that access to a resource of the one or more requests for resources is based on referencing the device control policy in a VPN-based parental control service, wherein the VPN-based parental control service restricts resource requests from the controlled device, the VPN-based parental control service comprising a local application on the controlled device to implement parental controls on the controlled device via the VPN.

9. The media of claim 8, wherein the parental control profile comprises an authentication mechanism for authenticating a user configuring the controlled device.

10. The media of claim 8, wherein the VPN restricts the one or more requests for resources from the controlled device to the VPN, wherein upon occurrence of a failure event of the VPN, the VPN is automatically reestablished prior to communicating the one or more requests for resources from the controlled device.

11. The media of claim 8, wherein the one or more requests for resources are restricted using a proxy service that controls both incoming and outgoing requests based on the device control policy.

12. The media of claim 8, the method further comprising receiving an indication that access to resources of the resources requests is restricted.

13. The media of claim 12, wherein the indication comprises custom block messages for specific content controls, usage controls and application controls.

14. A system for implementing parental controls using virtual private network (VPN)-based parental control services, the system comprising:
a controlling device component configured for:
accessing a set of predefined parental control policies, wherein a predefined parental control policy comprises a plurality of restricted resources, wherein the set of predefined parental control policies are provided in a VPN-based parental control service, wherein the VPN-based parental control service restricts resource requests from a controlled device, the VPN-based parental control service comprising a local application on the controlled device to implement parental controls on the controlled device via a VPN;
receiving a selected predefined parental control policy, wherein the selected predefined parental control policy is associated with a parental control profile, wherein the parental control profile includes instructions to configure the VPN on the controlled device with a device control policy;
generating the device control policy for the controlled device, wherein the device control policy comprises at least the selected predefined parental control policy; and
communicating, to a parental control server, the device control policy; a parental control server component configured for:
communicating the set of predefined parental control policies to the controlling device component;
receiving the device control policy for the controlled device;
restricting access to resources based on restrictions identified in the device control policy, wherein one or more requests for resources are received via a VPN associated with the parental control server component; and
communicating an indication that access to resources associated with the one or more requests for resources is restricted; and a controlled device component configured for:
  receiving the parental control profile, wherein the parental control profile is associated with a user that is configuring one or more controlled users and one or more controlled devices in the VPN-based parental control service to indicate device control polices for the corresponding one or more controlled devices;
  configuring the VPN for the controlled device using the parental control profile;
  restricting the one or more requests for resources from the controlled device to the VPN;
  communicating the requests for resources using the VPN; and
  receiving the indication that access to resources associated with requests is restricted.

15. The system of claim 14, wherein the controlling device component is further configured for generating a parental control service interface comprising the set of predefined parental control policies, wherein one or more predefined parental control policies of the set of predefined parental control policies are associated with a tier element that indicates an extent of restricted resources.

16. The system of claim 15, wherein the plurality of restricted resources of the one or more predefined control policies of the set of predefined parental control policy is selected based on the tier element, wherein selecting the plurality of restricted resources is at least based on a human-assisted process.

17. The system of claim 15, wherein the parental control service interface generates interface elements for parental control profile configuration, a predefined parental control policy configuration, and additional controls configuration for one or more controlled users and their corresponding one or more devices.

18. The system of claim 15, wherein the parental control service interface is generated using one of: a web-based portal interface or an application configuration manager interface.

19. The system of claim 14, wherein the controlling device component is further configured for receiving at least one of: a set of custom restricted resources, a usage control implemented based on a defined time window, or an application control associated with a selected application.

20. The system of claim 14, wherein configuring the VPN for the controlled device is based on an authentication mechanism associated with the parental control profile, wherein an authentication prompt of the authentication mechanism is generated to authenticate a user configuring the VPN.

* * * * *

UNITED STATES PATENT AND TRADEMARK OFFICE
CERTIFICATE OF CORRECTION

PATENT NO. : 9,912,697 B2
APPLICATION NO. : 14/728713
DATED : March 6, 2018
INVENTOR(S) : Scott Dorfman, Anthony M. Spinelli and Umesh S. Chhatre Page 1 of 1

It is certified that error appears in the above-identified patent and that said Letters Patent is hereby corrected as shown below:

In the Claims

Column 15, Line 10: Please remove "polices" and replace with --policies--
Column 15, Line 64: Please remove "polices" and replace with --policies--
Column 17, Line 6: Please remove "polices" and replace with --policies--

Signed and Sealed this
Second Day of April, 2019

Andrei Iancu
*Director of the United States Patent and Trademark Office*